Sept. 19, 1933.   H. A. KING   1,927,644
MOTOR MOUNTING
Filed Jan. 3, 1933   2 Sheets-Sheet 1

INVENTOR.
HAROLD A. KING.
BY
ATTORNEYS.

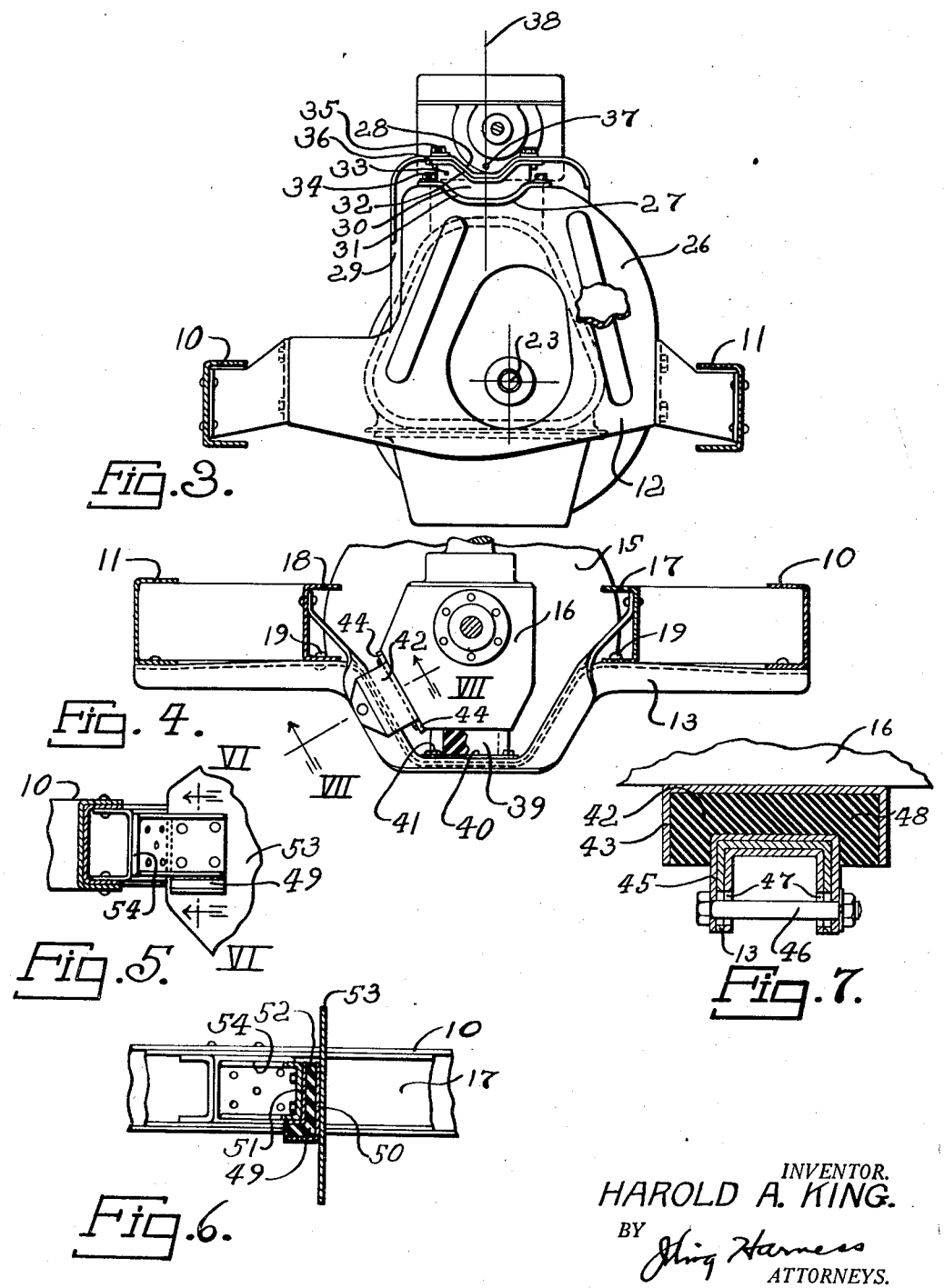

Patented Sept. 19, 1933

1,927,644

UNITED STATES PATENT OFFICE 1,927,644

MOTOR MOUNTING

Harold A. King, Birmingham, Mich., assignor to Chrysler Corporation, Detroit, Mich., a corporation of Delaware Application January 3, 1933. Serial No. 649,884

8 Claims. (Cl. 248—14.2)

This invention relates to improved mountings for reciprocating piston type engine units such as internal combustion engine units for use in propelling vehicles; and it has particular relation to a novel form and arrangement of mounting members which permit a limited amount of movement of the engine.

More specifically, the invention provides improved means in a mounting of this type for controlling the movements of the unit relative to its supporting structure which are caused by the torque reaction of the engine and other impulses applied thereon during operation so as to guard against the application of severe shock and vibration upon the structure with which the unit is associated.

The invention relates particularly to the type of engine unit mounting which permits oscillatory movement of the unit under the influence of the torque reaction of the engine about a predetermined axis which preferably passes substantially through the center of mass of the unit, and one of the main objects of the invention is to provide torque reaction opposing means in a mounting of this kind which is free from weight supporting function and which is adapted to oppose oscillation of the unit about such axis in the direction of rotation of the engine crankshaft with greater rigidity than that opposing oscillation of the engine in the opposite direction.

Other objects of the invention are to provide a torque reaction opposing member of this character which has a resilient element constructed and arranged in such a manner as to act in tension in opposing the oscillatory movement of the unit in the direction in which it is urged by the torque reaction of the engine and to act mainly in compression in opposing movement of the unit in the opposite direction beyond its natural position; to provide means, normally free from the weight of the unit, for yieldably holding the latter against longitudinal fore and aft and transverse movements and which is constructed and arranged so as to cooperate with the torque reaction opposing member in resisting the movement of the unit in a direction opposite to that in which it is urged by the torque reaction of the engine; to provide a stabilizing device of this character which cooperates with the torque opposing means in checking the rebounding action of the unit which follows each movement thereof caused by the torque reaction impulses so as to prevent the occurrence of oscillatory movements of the unit in a phased or synchronous relation with the torque reaction impulses; to provide cooperating torque opposing and rebound arresting means of this character which allow sufficient amplitude of movement of the unit by the torque reaction impulses to dissipate the latter without applying severe shock or impact upon the structure on which the unit is mounted; and to provide means of this character which is adapted to establish the natural vibration frequency of the unit, about the axis with respect to which oscillation thereof by the torque reaction impulses occurs, at a lower value than the frequency of the torque reaction impulses at the lower end of the driving range of the engine.

An illustrative embodiment of the invention is shown in the accompanying drawings, in which:

Fig. 3 is an elevational view of the front end of the unit and its mounting.

Fig. 4 is an elevational view, partly in section, of the rear end of the unit and its mounting.

Fig. 5 is a fragmentary transverse sectional view taken on the line V—V of Fig. 2.

Fig. 6 is a fragmentary vertical sectional view taken on the line VI—VI of Fig. 5.

Fig. 7 is a fragmentary transverse sectional view taken on the line VII—VII of Fig. 4.

Figure 1:
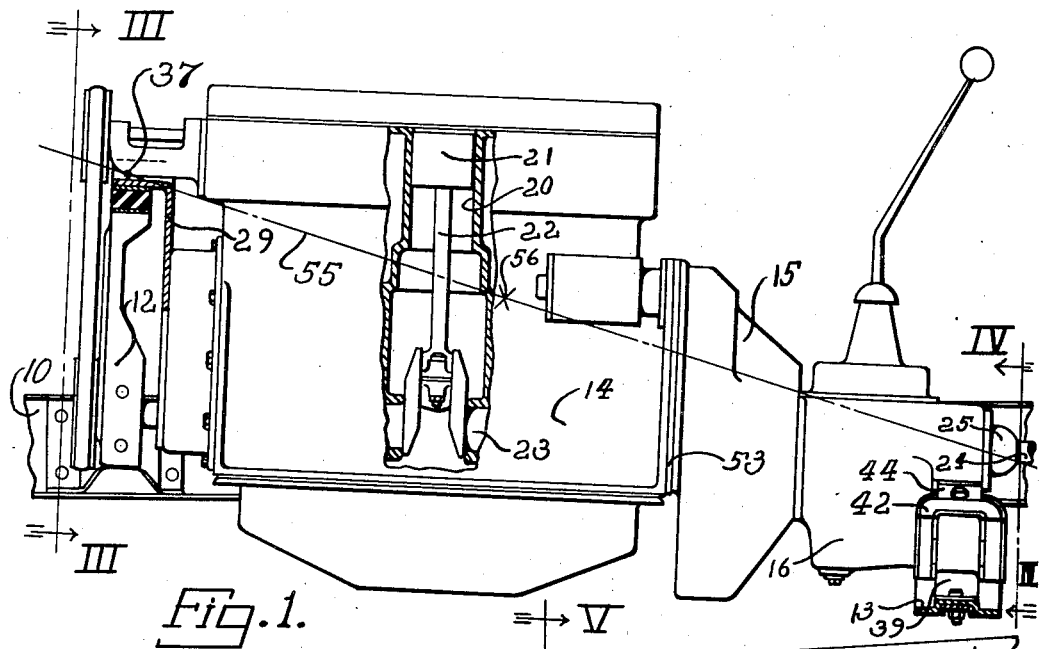
Fig. 1 is a side view, partly in elevation and partly in section, of a power plant unit mounted according to my invention in the chassis frame of a vehicle.
Figure 2:
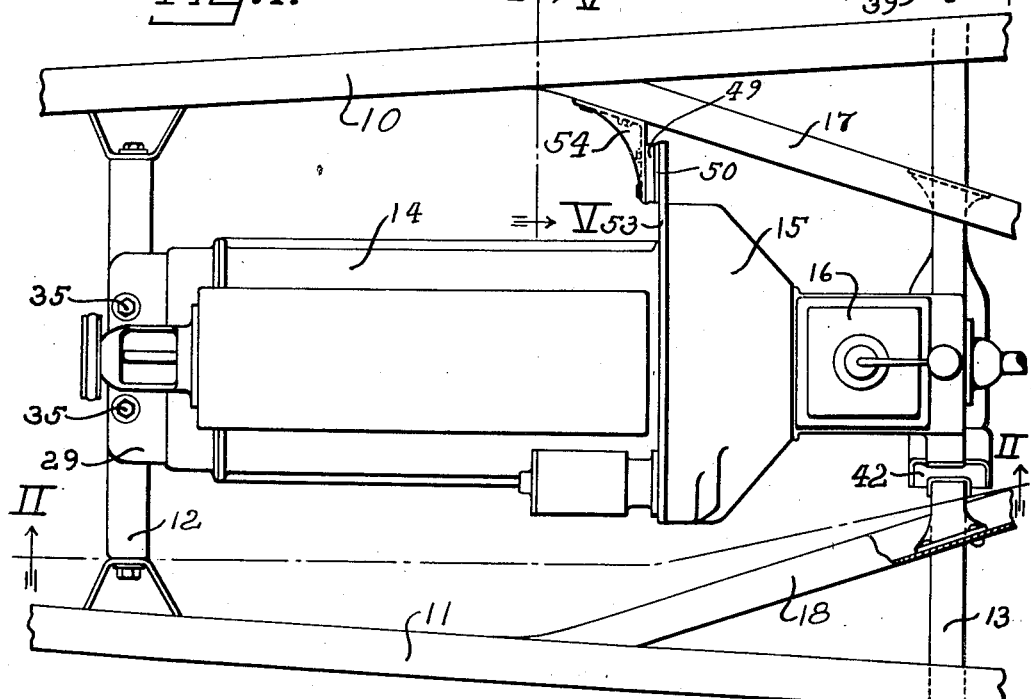
Fig. 2 is a plan view of the unit illustrated in Fig. 1.

In the form shown, the improved internal combustion engine mounting is illustrated in conjunction with a vehicle chassis frame which includes longitudinally extending channel members 10 and 11 and rigid transversely disposed front and rear members 12 and 13 which are secured at their ends to the longitudinal channel members 10 and 11. The transverse member 12 is located at the front end of the vehicle chassis frame and the transverse member 13 is located at the rear end of the power unit which is received between the longitudinal channel members. The power unit includes a crankcase 14, a clutch housing 15, and a transmission housing 16 which are longitudinally aligned and rigidly fixed together. A pair of converging frame reinforcing members 17 and 18 extend diagonally of the frame from a location between the front and rear transverse members 12 and 13. These reinforcing members have their forward extremities fixed to the longitudinal side members 10 and 11 of the frame and they are secured at their intermediate portions to the rear transverse member 13 by rivets 19, as illustrated in Fig. 4.

The internal combustion engine is of the multi-cylinder type, having for the purpose of illustration, six aligned cylinders 20, only one of which is shown. Slidably mounted in each cylinder is a reciprocating piston 21 to which is pivotally attached a connecting rod 22, which is journaled at its lower end on a crankshaft 23 in the usual manner. A clutch mechanism (not shown) within the housing 15, connects the crankshaft 23 with a transmission mechanism (not shown) within the housing 16 in a conventional manner, and the transmission mechanism in turn drives a propeller shaft 24 through a universal or other flexible joint 25.

The front transverse member 12 of the frame structure has an upstanding intermediate portion 26, best shown in Fig. 3, on which is formed an arcuate portion 27 which forms a support for and registers with a correspondingly shaped member 28 constituting a portion of an upstanding bracket 29, which is fixed on the front end of the crankcase 14. Disposed intermediate the arcuate shaped portions 27 and 28 is a support 30 which includes a pair of metallic plates 31 and 32, having correspondingly shaped arcuate portions which register with and substantially conform to the curvature of the arcuate members 27 and 28, and a rubber element 23 disposed between the plates 31 and 32 and rigidly fixed to the adjacent faces thereof, preferably by vulcanization. The lower plate 31 is secured to the arcuate portion 27 of the cross member 12 by means of bolts 34, and the upper plate 28 is secured to the bracket 29 by bolts 35 which extend through registering openings in the bracket 29 and in ears 36 on the ends of the plate 32.

The rubber connection between the plates 31 and 32 permits the latter to oscillate relative to the transverse frame member 12 about a substantially definite point designated by the numeral 37 and preferably located in a vertical plane 38 in which the center of mass of the engine lies. As shown, this vertical plane is offset somewhat to the left of the vertical plane containing the axis of the crankshaft 23. The location of this vertical plane may, however, vary within substantially wide limits in various engines, depending upon the distribution of the weight of the parts thereof, such as the generator, manifold, and diverse other auxiliary structures (not shown). The curvature of the plates 31 and 32 yieldably holds the front part of the engine against transverse movement and, together with the thickness and character of the rubber 33, predetermines the location of the point 37 about which the plate 32 is free to oscillate. As the plate 32 is fixed to the engine, the structure of the front support 30 establishes one of the points that determines the axis about which the engine may oscillate.

The front support 30 sustains the weight of the front end of the engine and, preferably, the entire remaining weight of the engine is supported by a rubber block 39, as best shown in Fig. 4, fixed to a metal plate 40, preferably by vulcanization, which is secured to the transverse frame member 13 by bolts 41. The rubber block 39 registers with and engages a substantially flat surface located at the rear end portion of the transmission housing 16. The rubber block 39 may, if desired, be fixed to the transmission casing 16 or to the plate 40, or may be fixed to both of these members, depending upon the characteristics desired therein.

The power unit is yieldably held against longitudinal fore and aft movement by the stabilizing member 42, best shown in Figs. 4 and 5, which includes a channel shaped metal plate 43 having ears 44 extending from the ends thereof by which it is rigidly fixed to the side of the transmission casing 16. The stabilizing member also includes a channel shaped plate 45 which extends into the open side of the plate 43 and which is rigidly fixed to the cross member 13 by a bolt 46 extending through apertures in the sides of the plate 45 and through elongated registering apertures 47 in the cross member 13. Disposed between the channel shaped plates 43 and 45 is a rubber element 48 which is rigidly secured, preferably by vulcanization, to the adjacent surfaces of the brackets. The portions of the rubber element 48 disposed between the side flanges of the brackets 43 and 45 act mainly under compression in yieldably restraining fore and aft movement of the unit. The stabilizing member is substantially completely relieved of the weight of the power unit by properly adjusting the bolt 46 in the elongated apertures 47 of the plate 45.

The stabilizing member 42 is disposed at an inclination to a vertical plane and it is constructed and arranged in such a manner as to oppose oscillatory movement of the unit in the direction in which it is urged by the torque reaction impulses of the engine with less rigidity than it opposes oscillatory movement of the unit in the opposite direction. This is accomplished by arranging the stabilizing member in such a manner as to place the rubber element 48 mainly in tension during oscillatory movement of the power unit in the direction in which it is urged by the torque reaction impulses and causing it to be placed mainly under compression during oscillatory movement of the unit in the opposite direction. The stabilizing member 42 is also constructed and arranged in such a manner as to have the rubber element act in compression in opposing lateral bodily movement of the unit to the left, as viewed in Fig. 4.

A torque reaction opposing member 49 is interposed between the frame of the vehicle and the side of the power unit opposite from the stabilizing member 42. This torque opposing member includes a pair of L-shaped plates 50 and 51, between which is disposed a rubber element 52. The rubber element 52 is rigidly fixed to the adjacent sides of the plates, preferably by vulcanization, and the plate 50 is rigidly secured to a support 53 mounted on the power plant unit between the crankcase 14 and the clutch housing 15. The plate 51 is rigidly fixed to a bracket 54 which is secured to the diagonal reinforcing member 17 of the chassis frame. The torque reaction opposing member 49 is arranged in such a manner as to position one pair of corresponding sides of the plates 50 and 51 in substantially vertical planes and the other pair of corresponding sides of the L-shaped plates in substantially horizontal planes. The horizontal portion of the plate 51 which is rigid with the chassis frame is located above the horizontal side portion of the plate 52 which is rigid with the power unit, and due to this arrangement, oscillatory movement of the unit in the direction in which it is urged by the torque reaction impulses, causes the rubber element 52 to be placed under tension and oscillatory movement of the power unit in the opposite direction causes that portion of the rubber element which is disposed between the horizontal parts of the plates 50 and 51 to be placed under compression. As rubber is more easily deformable under tension than under compression, it is obvious that the opposition to oscillatory movement of the engine in the direction in which it is urged by the torque reaction impulses is less than the opposition to oscillatory movement of the unit in the opposite direction. The rubber element 52 of the torque reaction opposing member 49 also acts under tension in opposing bodily transverse movement of the power plant to the right, as viewed in Fig. 4, and as shown in Fig. 1, that portion of the rubber element 52 which is disposed between the vertical side of the L-shaped plates 50 and 51 acts under compression in opposing forward movement of the power plant relative to the chassis frame.

The substantially fixed point 37, established by the oscillatable support 19, constitutes one point on the axis about which the power plant tends to oscillate under the influence of the torque reaction impulses resulting from operation of the engine. The rubber block 39 of the rearward mounting is adapted to permit oscillation of the unit about an axis 55, illustrated in Fig. 1, and determined by the center 37 and the center of mass 56 of the power unit. The rubber block is located at a considerable distance from this axis and, in addition to supporting a considerable portion of the weight of the unit, may be constructed to offer any desired force to resiliently restrain the lower part of the engine from turning about the axis 55.

The oscillatable support 30 is so disposed with respect to the engine assembly that a neutral axis of oscillation thereof, passing substantially through the center of mass and in close proximity to the axis of the crankshaft at the rear end of the transmission mechanism where the universal joint is located, will pass approximately through the center of oscillation thereof. As the universal joint is in a plane at a lower horizontal level than the center of mass of the power unit, this requires that the center 37 be disposed in a higher horizontal plane than the center of mass. By this arrangement, the engine assembly is permitted to oscillate about its neutral axis of oscillation with the member 29 and 30 serving to prevent any material departure therefrom.

The natural vibration frequency of the engine upon its mountings is influenced by the characteristics of the rubber in the front and rear mountings and by the characteristics of the rubber in the stabilizing member 42 and torque reaction opposing member 49. As the rubber elements of the mounting members are called upon to accomplish definite functions, such as the supporting of the weight and limiting its movement within a predetermined desired range, respectively, they cannot also always be provided with those properties which are required to bring the natural vibration frequency below the frequency of the torque reaction impulses at the lower end of the driving range of the engine. For this reason, the natural vibration frequency of the engine is predetermined mainly by the torque reaction opposing member which does not sustain any of the weight of the unit. This is accomplished by providing rubber in the torque opposing member which has the characteristics required to bring the natural frequency of the system with respect to the axis 55 below the frequency of the torque reaction impulses at the lower end of the driving range of the engine, and in this way the occurrence of a synchronous relation between the natural vibration frequency of the system and the torque reaction impulses is guarded against.

The difference in the opposition to oscillatory movement of the power unit in respectively opposite directions about the axis 55 which is yieldingly applied by the torque reaction opposing member 49 and stabilizing device 42 causes a difference in the amplitude of movement of the unit in respectively opposite directions from its normal position which also assists in the prevention of the occurrence of the oscillatory movements of the engine in the synchronous or phased relationship with the applications of the torque reaction impulses upon the power unit. In this manner, direct transmission of the torque reaction impulses to the chassis frame is prevented and the development of an aggravated vibratory condition by the torque reaction impulses is effectively guarded against.

Although but one specific embodiment of the invention is herein shown and described, it will be understood that various changes in the size, shape, and arrangement of parts may be made without departing from the spirit of my invention, and it is not my intention to limit its scope other than by the terms of the appended claims.

What I claim is:

1. The combination of a frame, a power plant unit including an internal combustion engine, said unit being of the type that is subject to oscillation about a predetermined axis under the influence of the forces inherent in its operation, means for mounting said unit on said frame structure constructed and arranged in such a manner as to sustain substantially all the weight of said unit and to permit oscillatory movement of said unit about said axis, and means for opposing such oscillatory movement including a resilient element constructed and arranged in such a manner as to act in tension in opposing movement of said unit about said axis in one direction and in compression in opposing movement of said unit about said axis in an opposite direction.

2. The combination of a frame, a power plant unit including an internal combustion engine, said unit being of the type that is subject to oscillation about a predetermined axis under the influence of the torque reaction impulses of the engine, means for mounting said unit on said frame structure constructed and arranged in such a manner as to sustain substantially all the weight of said unit and to permit oscillatory movement of said unit by said torque reaction impulses, and means for opposing such oscillatory movement including a resilient element constructed and arranged in such a manner as to act in tension in opposing movement of said unit about said axis by said torque reaction impulses and to act mainly in compression in opposing movement of said unit in an opposite direction beyond its natural position.

3. The combination of a frame, a power plant unit including an internal combustion engine, said unit being of the type that is subject to oscillation about a predetermined axis under the influence of the torque reaction impulses of the engine, means for mounting said unit on said frame structure constructed and arranged in such a manner as to sustain substantially all the weight of said unit and to permit oscillatory movement of said unit by said torque reaction impulses, and means for opposing such oscillatory movement including a pair of spaced angle plates, one fixed to said unit and the other to said frame, and having a rubber element disposed therebetween and secured to the adjacent sides of said plates, said angle plates being constructed and arranged in such a manner as to place said rubber under tension during movement of said unit about said axis in one direction and under compression during movement of said unit about said axis in an opposite direction.

4. The combination of a frame, a power plant unit including an internal combustion engine, said unit being of the type that is subject to oscillation about a predetermined axis under the influence of the forces inherent in its operation, means for mounting said unit on said frame structure constructed and arranged in such a manner as to sustain substantially all the weight of said unit and to permit oscillatory movement of said unit about said axis, means for opposing such oscillatory movement including a resilient element constructed and arranged in such a manner as to act in tension in opposing movement of said unit about said axis in one direction and in compression in opposing movement of said unit about said axis in an opposite direction, and a stabilizing member coacting between said unit and frame including a yieldable element and having rigid elements cooperating with said yieldable element for yieldably holding said unit against bodily transverse and longitudinal movements relative to said frame.

5. In a vehicle including a frame, a power unit including an internal combustion engine, a pair of resilient mounting members interposed between said frame and unit sustaining substantially the entire weight of said unit and constructed and arranged in such a manner as to permit oscillation of said unit about a longitudinally extending axis under the influence of the torque reaction of said engine, a stabilizing member on one side of said unit having a rubber element fixed to said frame and a rigid element fixed to said unit and rubber element for yieldably holding said unit against bodily vertical, transverse and longitudinal movements relative to said frame, and a torque reaction opposing member on the opposite side of said unit having a rubber element fixed to said unit and frame respectively for yieldably opposing oscillatory movement of said unit.

6. In a vehicle including a frame and a power unit having an internal combustion engine, the combination with resilient mounting members interposed between said frame and unit sustaining substantially the entire weight of said unit and constructed and arranged in such a manner as to permit oscillation of said unit about an axis extending substantially through the center of mass of said unit, of mechanism for controlling the movement of said unit relative to said frame including a pair of interfitting channel members, one fixed to said frame and the other fixed to said unit, a rubber element between said channel members and fixed by vulcanization thereto for yieldably opposing vertical, transverse and longitudinal movement of said unit, a pair of interfitting angle plates, one secured to said unit and the other to said frame, said angle plates having vertically and horizontally disposed sides, and a rubber element disposed between said angle plates and secured to the vertically and horizontally disposed sides thereof for opposing oscillation of said unit in one direction under tension and in the opposite direction under compression.

7. In a vehicle including a frame and a power unit having an internal combustion engine, the combination with resilient mounting members interposed between said frame and unit sustaining substantially the entire weight of said unit and constructed and arranged in such a manner as to permit oscillation of said unit about an axis extending substantially through the center of mass of said unit, of mechanism for controlling the movement of said unit relative to said frame including a torque reaction opposing member having a rubber element and a pair of rigid angle plates on opposite sides thereof constructed and arranged in such a manner as to place all of said rubber element under tension during oscillation of said unit in one direction and to place a portion of said rubber element under compression during oscillation of said unit in an opposite direction, and a stabilizing member interposed between said frame and a side of said unit including a rubber element and having rigid plates fixed to opposite sides thereof and to said unit and frame respectively for yieldably opposing bodily vertical, longitudinal and transverse movements of said unit.

8. In a vehicle including a frame and a power unit having an internal combustion engine, the combination with resilient mounting members interposed between said frame and unit sustaining substantially the entire weight of said unit and constructed and arranged in such a manner as to permit oscillation of said unit about an axis extending substantially through the center of mass of said unit, of mechanism for controlling the movement of said unit relative to said frame including a torque reaction opposing member having a rubber element and a pair of rigid angle plates on opposite sides thereof constructed and arranged in such a manner as to place all of said rubber element under tension during oscillation of said unit in one direction and to place a portion of said rubber element under compression during oscillation of said unit in an opposite direction, and a stabilizing member interposed between said frame and a side of said unit including a rubber element and having rigid plates fixed to opposite sides thereof and to said unit and frame respectively for yieldably opposing bodily vertical, longitudinal and transverse movements of said unit, said stabilizing member being inclined with respect to a horizontal plane and located below said axis so as to freely accommodate oscillatory movement of said unit in one direction about said axis and to oppose movement thereof in an opposite direction.

HAROLD A. KING.